United States Patent
Lim et al.

(10) Patent No.: US 10,680,785 B2
(45) Date of Patent: Jun. 9, 2020

(54) EXTENDING NARROW BAND MONITORING

(71) Applicant: APPLE INC., Cupertino, CA (US)

(72) Inventors: Junsung Lim, Santa Clara, CA (US); Li Su, San Jose, CA (US); Johnson O. Sebeni, Fremont, CA (US); Yang Li, Plano, TX (US); Young Jae Kim, San Jose, CA (US); Zhu Ji, San Jose, CA (US)

(73) Assignee: Apple Inc., Cupertino, CA (US)

( * ) Notice: Subject to any disclaimer, the term of this patent is extended or adjusted under 35 U.S.C. 154(b) by 60 days.

(21) Appl. No.: 15/941,651

(22) Filed: Mar. 30, 2018

(65) Prior Publication Data

US 2018/0287751 A1 Oct. 4, 2018

Related U.S. Application Data

(60) Provisional application No. 62/479,445, filed on Mar. 31, 2017.

(51) Int. Cl.
*H04L 5/00* (2006.01)
*H04L 25/02* (2006.01)

(52) U.S. Cl.
CPC ............ *H04L 5/006* (2013.01); *H04L 5/005* (2013.01); *H04L 5/0094* (2013.01); *H04L 25/0224* (2013.01); *H04L 25/0226* (2013.01)

(58) Field of Classification Search
CPC ................................ H04L 5/006; H04L 5/005
See application file for complete search history.

(56) References Cited

U.S. PATENT DOCUMENTS

| | | | |
|---|---|---|---|
| 2010/0063827 A1* | 3/2010 | Gao | G10L 21/038 704/500 |
| 2011/0235601 A1* | 9/2011 | Yoo | H04L 5/0053 370/329 |
| 2016/0269956 A1* | 9/2016 | Sawhney | H04W 76/18 |
| 2017/0033843 A1* | 2/2017 | Wang | H04W 4/70 |
| 2017/0064685 A1* | 3/2017 | Rico Alvarino | H04B 7/0456 |

* cited by examiner

*Primary Examiner* — Angel T Brockman
(74) *Attorney, Agent, or Firm* — Fay Kaplun & Marcin, LLP

(57) ABSTRACT

A method, device and integrated circuit for receiving signals in a narrow bandwidth range from a base station of a network, the narrow bandwidth range being a portion of an overall bandwidth range of the network and the signals comprising one or more of cell-specific reference signal (CRS) tones, determining whether a condition exists based on the one or more CRS tones, when the condition exists, extending the narrow bandwidth range to an extended narrow bandwidth range, the extended narrow bandwidth range including at least one further CRS tone than the narrow bandwidth range and monitoring the extended narrow bandwidth range to receive further signals comprising the at least one further CRS tone.

20 Claims, 5 Drawing Sheets

EXTENDING NARROW BAND MONITORING

PRIORITY CLAIM/INCORPORATION BY REFERENCE

This application claims priority to U.S. Provisional Application 62/479,445 entitled "Device, System, and Method for Extending Narrow Band Monitoring," filed on Mar. 31, 2017, the entirety of which is incorporated herein by reference.

BACKGROUND INFORMATION

A user equipment (UE) may be configured to establish a connection to at least one of a plurality of different networks or types of networks to perform a variety of different functionalities via the network connection. For example, the UE may communicate with another UE through the network connection. In another example, the UE may communicate with various servers to exchange data. In a further example, a combination of these types of functionalities may be performed such as a Voice over Internet Protocol (IP) (VoIP) call in which the UE may register with an IP Multimedia Subsystem (IMS) for the VoIP functionality to be performed.

When the UE has established the connection to the network via an association operation with a base station of the network, the base station may transmit various types of data to the UE such as control information to, for example, define the manner in which data is to be exchanged between the UE and the network. The UE may utilize cell-specific reference signal (CRS) tones to determine a network parameter such as a downlink power. To receive the CRS tones, the base station defines a bandwidth range that the UE is to monitor. Using more CRS tones within the bandwidth range may result in more accurate determinations regarding the channel and/or network parameters. However, increasing the bandwidth range results in an increased power consumption by the UE which has a limited power supply. When limiting the bandwidth range to conserve power, there are fewer CRS tones that are measured which results in lower demodulation performance and/or inaccurate measurements.

SUMMARY

An exemplary embodiment is directed at a method performed by a device. The method includes receiving signals in a narrow bandwidth range from a base station of a network, the narrow bandwidth range being a portion of an overall bandwidth range of the network and the signals comprising one or more of cell-specific reference signal (CRS) tones, determining whether a condition exists based on the one or more CRS tones, when the condition exists, extending the narrow bandwidth range to an extended narrow bandwidth range, the extended narrow bandwidth range including at least one further CRS tone than the narrow bandwidth range and monitoring the extended narrow bandwidth range to receive further signals comprising the at least one further CRS tone.

A further exemplary embodiment is directed to a device having a transceiver and a processor. The transceiver is configured to establish a connection to a base station of a network, the transceiver receiving a narrow bandwidth range from the base station, the narrow bandwidth range being a portion of an overall bandwidth range of the network, the transceiver configured to receive signals in the narrow bandwidth range, the signals comprising one or more cell-specific reference signal (CRS) tones. The processor is configured to determine whether a condition exists based on the one or more CRS tones and when the condition exists, extend the narrow bandwidth range to an extended narrow bandwidth range, the extended narrow bandwidth range including at least one further CRS tone than the narrow bandwidth range, wherein the transceiver monitors the extended narrow bandwidth range to receive further signals comprising the at least one further CRS tone.

A still further exemplary embodiment is directed to an integrated circuit having circuitry configured to receive signals in a narrow bandwidth range from a base station of a network, the narrow bandwidth range being a portion of an overall bandwidth range of the network and the signals comprising one or more of cell-specific reference signal (CRS) tones, circuitry configured to determine whether a condition exists based on the one or more CRS tones and when the condition exists, circuitry configured to extend the narrow bandwidth range to an extended narrow bandwidth range, the extended narrow bandwidth range including at least one further CRS tone than the narrow bandwidth range.

DETAILED DESCRIPTION

Figure 1:
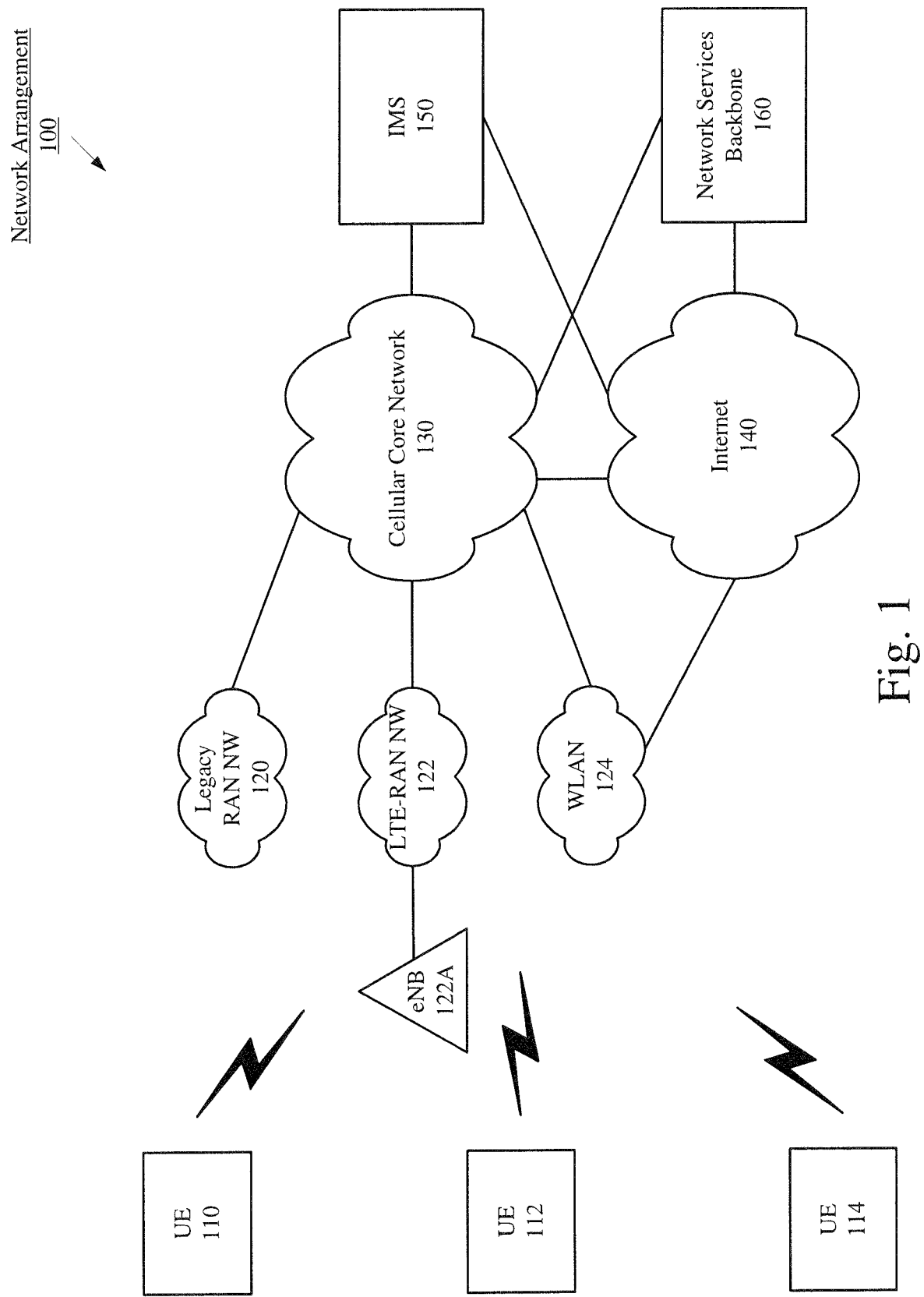
FIG. 1 shows a network arrangement according to the various exemplary embodiments described herein.

The exemplary embodiments may be further understood with reference to the following description and the related appended drawings, wherein like elements are provided with the same reference numerals. The exemplary embodiments are related to a device, system, and method for dynamically extending a monitoring range when a narrow bandwidth range is assigned. Specifically, a user equipment (UE) may be connected to a network (e.g., a Long Term Evolution (LTE) network) in which a base station of the network (e.g., an evolved Node B (eNB)) transmits control information to the UE. The control information may indicate that the narrow bandwidth range is to be used. The UE may identify various conditions being experienced to determine whether the assigned narrow bandwidth range is to be extended.

Initially, it is noted that the exemplary embodiments are described with regard to the network being a LTE network and the base station of the network being an eNB. However, it should be noted that the use of the LTE network and the eNB is only exemplary, for example, the network may also be a 5G network and a gNB base station. Those skilled in the art will understand that the connection of the UE may be to any network that supports the UE being assigned a narrow bandwidth range to monitor. As will also become apparent below, the exemplary embodiments may be a mechanism utilized by the UE based on operations performed by the network and its base station. That is, the network operation does not change when using the exemplary embodiments.

It is also noted that the exemplary embodiments are described with regard to a UE. However, the UE is only exemplary. The exemplary embodiments may be utilized with any device that may establish a connection with a network and configured with the hardware, software, and/or firmware to monitor a bandwidth. Therefore, the UE as described herein is used to represent any device.

When the UE has established a connection with the LTE network via the eNB, the eNB may transmit control information or other types of data. For example, the eNB may transmit scheduling information for data exchange via a physical downlink control channel (PDCCH) and the data corresponding to the scheduling information via a physical downlink shared channel (PDSCH). When receiving data from the eNB (both control information and other types of data), the UE may receive cell-specific reference signal (CRS) tones that are present in the bandwidth associated with the network and/or base station in each transmission time interval (TTI). Using the CRS tones, a variety of network parameters may be measured by the UE, such as downlink power.

When the UE has access to an increased amount of information such as an increased number of CRS tones, the UE may determine measurements with a higher confidence and more reliability. However, monitoring for this increased number of CRS tones across a wider bandwidth range requires more power. With the power supply of the UE being used for a wide variety of functionalities and operations, wireless technologies are evolving to optimize the power consumption by the UE to support improved power efficiency. For example, the UE may also be devices included in the Internet of Things (IoT) (e.g., Category-M UE) or Machine-Type Communication (MTC) devices. These types of devices may have an even smaller available power supply.

One manner of saving power is to reduce the bandwidth range that is monitored by the UE. That is, the UE may save power by monitoring less radio frequency (RF) bandwidth having a smaller sample size (although the network may still support a larger, overall bandwidth). Accordingly, the base station of the network may assign a narrow bandwidth within the overall bandwidth for the UE to monitor. For example, in the 3GPP Release 13, enhanced MTC (eMTC) or Category-M1 devices are introduced for power efficient and overage limited operation. Specifically, the narrow bandwidth reduces the overall monitored bandwidth to 1.4 MHz (e.g., a 6 resource block (RB) narrowband).

Although utilizing the narrow bandwidth reduces the overall power consumption for monitoring and receiving CRS tones, the narrow bandwidth is not always a beneficial feature to utilize. As noted above, the narrow bandwidth has a smaller sample size that limits the available CRS tones that may be received. Those skilled in the art will understand that a limited number of CRS tones may adversely affect how measurements are determined. For example, the CRS tones may be used for channel estimation, for measuring parameters used for filter coefficients of channel estimation (e.g., delay spread, Doppler spread, etc.), for measuring various network parameters (e.g., reference signal received power (RSRP), received signal strength indicator (RSSI), reference signal received quality (RSRQ), channel state information (CSI), channel quality indicator (CQI), rank indicator (RI), precoding matrix indicator (PMI), etc.) for a wide-band report, etc. With all these different measurements being made based on the CRS tones that are received, fewer CRS tones may result in less reliable and/or inadequate measurements being determined. Thus, the tradeoff from using the narrow bandwidth to monitor for CRS tones is less power consumption per TTI but lower demodulation performance (e.g., due to worse channel estimations) and/or inaccurate measurements (e.g., resulting in improper handover consequences).

In view of the tradeoff, the exemplary embodiments are configured to leverage the benefits of utilizing the narrow bandwidth when predetermined conditions are met, but dynamically utilizing an extended narrow bandwidth when more CRS tones may be needed. The extended narrow bandwidth may be any bandwidth range that is greater than the narrow bandwidth that is assigned to the UE. Specifically, the extended narrow bandwidth may be a range that includes at least one more CRS tones that may be received in addition to the available CRS tones in the narrow bandwidth. As will be described in further detail below, the base station may configure the UE to operate in an assigned narrow bandwidth which is a part of a system (or overall network) bandwidth. The UE may selectively determine an extended narrow bandwidth that includes the assigned narrow bandwidth to potentially receive more neighboring CRS tones. The UE retains the capability of switching between the assigned narrow bandwidth, the extended narrow bandwidth, and any further extended narrow bandwidths.

FIG. 1 shows a network arrangement 100 according to the exemplary embodiments. The network arrangement 100 includes UEs 110-114. Those skilled in the art will understand that the UEs 110-114 may be any type of electronic component that is configured to communicate via a network, e.g., mobile phones, tablet computers, desktop computers, smartphones, phablets, embedded devices, wearables, Cat-M devices, Cat-M1 devices, MTC devices, eMTC devices, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate directly with one or more networks. In this example, the networks with which the UEs 110-114 may wirelessly communicate are a legacy radio access network (RAN) 120, a LTE RAN (LTE-RAN) 122, and a wireless local area network (WLAN) 124. However, it should be understood that the UEs 110-114 may also communicate with other types of networks and may also communicate using a wired connection. With regards to the exemplary embodiments, the UEs 110-114 may establish a connection with the LTE-RAN 122 to, among other functionalities, perform VoLTE calls with other UEs. For example, the UEs 110-114 may have a LTE chipset and communicate with the LTE-RAN 122. As those skilled in the art will understand, the exchange of data in performing operations associated with the LTE-RAN 122 such as the VoLTE call may utilize control information from the LTE-RAN 122. Thus, the UEs 110-114 may receive the control information from the LTE-RAN 122 to coordinate the data exchange. Furthermore, in preparing to receive the control information and/or other data (e.g., the VoLTE call data), the UE may receive CRS tones (e.g., in each TTI) to determine the manner in which the data is to be exchanged with the LTE-RAN 122. Again, the use of three (3) networks is only exemplary and there may be any other number of networks with which the UEs 110-114 may communicate.

The legacy RAN 120 and the LTE-RAN 122 are portions of cellular networks that may be deployed by cellular providers (e.g., Verizon, AT&T, Sprint, T-Mobile, etc.).

These networks 120 and 122 may include, for example, base client stations (Node Bs, eNodeBs, HeNBs, etc.) that are configured to send and receive traffic from UEs that are equipped with the appropriate cellular chip set. As noted above, the exemplary embodiments are described with regard to the LTE-RAN 122 but may be modified for use with the legacy RAN 120 when monitoring for CRS tones or their equivalents. The WLAN 124 may include any type of wireless local area network (WiFi, Hot Spot, IEEE 802.11x networks, etc.). The exemplary embodiments may also be utilized with the WLAN 124 when monitoring CRS tones or their equivalents.

In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110-114 using the IP protocol. The IMS 150 may communicate with the cellular core network 130 and the Internet 140 to provide the multimedia services to the UEs 110-114. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The exemplary embodiments relate to the UEs 110-114 connecting to the LTE-RAN 122 via an evolved Node B (eNB) 122A. The eNB 122A may be configured to exchange data with the UEs 110-114 through scheduled data transmissions defined using control information. For example, the control information may be provided using a PDCCH and/or a PDSCH transmission at predefined times when the UEs 110-114 are configured to receive data. The eNB 122A may also exchange the data that is scheduled in the control information. The eNB 122A may further broadcast CRS tones during each TTI, whether or not there is data scheduled to be exchanged with any or all of the UEs 110-114. Accordingly, the UEs 110-114 may receive the CRS tones when monitoring for them. The UEs 110-114 may establish a connection to the LTE-RAN 122. Those skilled in the art will understand that any association procedure may be performed for the UEs 110-114 to connect to the LTE-RAN 122. For example, as discussed above, the LTE-RAN 122 may be associated with a particular cellular provider where the UE 110-114 and/or the user thereof has a contract and credential information (e.g., stored on a SIM card). Upon detecting the presence of the LTE-RAN 122, the UEs 110-114 may transmit the corresponding credential information to associate with the LTE-RAN 122. More specifically, the UEs 110-114 may associate with a specific access point (e.g., the eNB 122A of the LTE-RAN 122).

Figure 2:
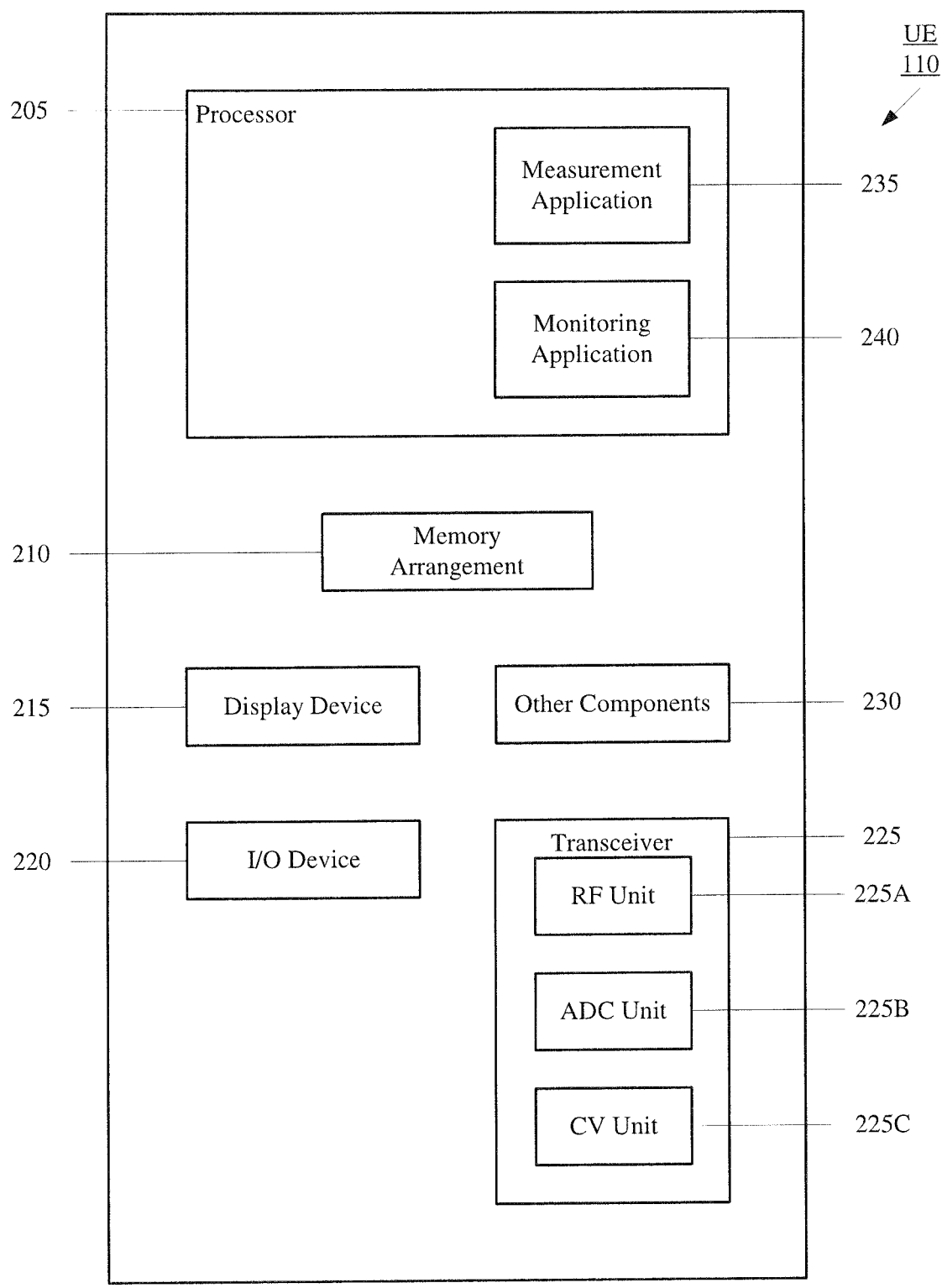
FIG. 2 shows a user equipment according to the various exemplary embodiments described herein.

FIG. 2 shows the UE 110 of the network arrangement 100 of FIG. 1 according to the exemplary embodiments. Specifically, the UE 110 is configured to execute a plurality of applications that perform functionalities to determine whether an extended narrow bandwidth is to be utilized and select from one or more extended narrow bandwidth ranges based on a narrow bandwidth range assigned by the eNB 122A. For exemplary purposes, the UE 110 may also represent the UEs 112, 114. The UE 110 may represent any electronic device that is configured to perform wireless functionalities and may be representative of one or more of the UEs 110-114 (examples of which are noted above). The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of applications of the UE 110. For example, the applications may include a measurement application 235. The measurement application 235 may be configured to determine a variety of different measurements such as a channel estimation, a RSRP, a RSRQ, a RSSI, etc. Those skilled in the art will understand how these measurements may be determined using any suitable calculation or algorithm. The results of the measurement application 235 may be output to determine subsequent aspects of the exemplary embodiments.

In another example, the applications may include a monitoring application 240. The monitoring application 240 may receive an assigned narrow bandwidth range from the eNB 122A. Thus, the UE 110 may be configured to utilize the narrow bandwidth feature. The monitoring application 240 may also receive the output of the measurement application 235. Using the measurements in the output of the measuring application 235, the monitoring application 240 may determine whether to extend the assigned narrow bandwidth to an extended narrow bandwidth. Specifically, the monitoring application 240 may determine a quality of the measurements to determine whether the CRS tones that have been received in the assigned narrow bandwidth range provide measurements that are sufficient and reliable. For example, there may be an insufficient number of CRS tones that were received in the assigned narrow bandwidth. In such a scenario, the monitoring application 240 may conclude that the extended narrow bandwidth is to be used. In another example, the CRS tones that are received in the assigned narrow bandwidth may provide inadequate information to reliably calculate the selected measurement (e.g., an average is calculated for the measurement but the sample pool of information from the CRS tones is insufficient for a true average value to be determined). In a further example, information that occurs prior to and/or subsequent to a selected CRS tone may be required for the measurement but one or both of this information may be missing. Thus, when the conditions being experienced by the UE 110 result in the assigned narrow bandwidth range being insufficient for proper measurements to be made, the monitoring application 240 may consider the extended narrow bandwidth.

If the monitoring application 240 determines that the extended narrow bandwidth is to be used, the monitoring application 240 may select an extended narrow bandwidth. Utilizing the assigned narrow bandwidth range, the monitoring application 240 may apply the extended narrow bandwidth onto the assigned narrow bandwidth range. Specifically, the assigned narrow bandwidth range may be extended on the lower end, the upper end, or a combination thereof so long as the assigned narrow bandwidth range is included in the extended narrow bandwidth range. For example, the LTE-RAN 122 may have an overall bandwidth from 900 MHz to 950 MHz and assigns a narrow bandwidth range of 1.4 MHz from 915.0 MHz to 916.4 MHz for the UE 110. The UE 110 may have selected an extended narrow bandwidth of 5 MHz such that the extended narrow bandwidth range may be 911.4 MHz to 916.4 MHz, 915.0 MHz to 920.0 MHz, 913.2 MHz to 918.2 MHz, etc. The amount of extended bandwidth may be predetermined or it may be determined dynamically, e.g., depending on the bandwidth range being monitored, depending on the current conditions being experienced by the UE 110, etc.

Once the extended narrow bandwidth range is determined, the monitoring application 240 may perform a monitoring functionality in which CRS tones are received within this extended range. Thus, based on the further CRS tones that are received in the extended narrow bandwidth range, the measurement application 235 may perform its functionality in determining measurements that are based on more information (e.g., more CRS tones). Those skilled in the art will appreciate that even one additional received CRS tone may improve the reliability of measurements. For example, further received CRS tones may improve an average when measuring a RSRP or a signal to interference plus noise ratio (SINR), may allow more precise measurements of a RSRP, a RSRQ, a RSSI, a CQI, a RI, a PMI, etc., may enable better performance for channel estimation (e.g., feed more frequency CRS tones to derive a parameter estimation [e.g., delay spread, Doppler estimate, etc.], expand taps of channel estimation filters, assist demodulation reference signal (DMRS) demodulation for Cat-M PDCCH (MPDCCH) or PDSCH, overcome band-edge problems for CRS channel estimation, etc.), etc. It is noted that it may be assumed that the UE 110 has the capability of performing the measurements in the narrow bandwidth as well as in the extended narrow bandwidth with various sets of received CRS tones.

It should be noted that the above noted applications each being an application (e.g., a program) executed by the processor 205 is only exemplary. The functionality associated with the applications may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. In addition, in some UEs, the functionality described for the processor 205 is split among two processors, a baseband processor and an applications processor. The exemplary embodiments may be implemented in any of these or other configurations of a UE. For illustrative purposes, the processor 205 may be a baseband processor.

The memory 210 may be a hardware component configured to store data related to operations performed by the UE 110. As will be described in further detail below, the memory 210 may store a table of extended narrow bandwidths from which the monitoring application 240 may select. The selection of an extended narrow bandwidth results in various other operations and functionalities to be defined and performed. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to exchange data with the eNB 122A. For example, the transceiver 225 may be configured to receive CRS tones that are broadcast by the eNB 122A within the overall bandwidth of the LTE-RAN 122, more specifically within the assigned narrow bandwidth range or the extended narrow bandwidth range. The transceiver 225 may enable communication with the LTE-RAN 122 or with other electronic devices directly or indirectly through the LTE-RAN 122 to which the UE 110 is connected. The transceiver 225 may operate on a variety of different frequencies or channels (e.g., set of consecutive frequencies). Thus, an antenna (not shown) coupled with the transceiver 225 enables the transceiver 225 to operate on the LTE frequency band.

In supporting the capability of utilizing a bandwidth beyond what has been assigned by the eNB 122A, the transceiver 225 may include a plurality of different components configured for this functionality. As illustrated, the transceiver 225 may include a RF unit 225A, an analog to digital converter (ADC) unit 225B, and a control voltage (CV) unit 225C each having the capability of operating in at least two different bandwidth options. The RF unit 225A may be configured to tune to one of a plurality of RF bandwidths. The ADC unit 225B may be configured to control one of a plurality of sampling frequencies. The CV unit 225FC may be configured to control one of a plurality of voltage and clock frequencies.

As noted above, the processor 205 may be a baseband processor. In view of the RF unit 225A, the ADC unit 225B, and the CV unit 225C, the baseband processor 205 may perform subsequent operations to demodulate signals received via the transceiver 225 and generate feedback messages. Accordingly, the baseband processor 205 may include a receiver unit, a channel estimation unit, a measurement unit, a tracking unit, etc. having the capability of operating in at least two different bandwidth options. The receiver unit may be configured to calculate a log likelihood ratio (LLR) and decode based on a received LLR. The receiver unit may also be configured to perform Hybrid Automatic Repeat Request (HARQ) operations (e.g., HARQ combine). The channel estimation unit may be a component of the measurement application 235 configured to estimate a channel coefficient and feed a corresponding output to the receiver unit. The measurement unit may also be a component of the measurement application 235 configured to estimate a RSRP, a RSSI, a RSRQ, a CQI, a RI, a PMI, etc. as well as other subsequent measurements performed by the receiver unit. The tracking unit may be configured to track an automatic frequency correction (AFC), an automatic gain control (AGC), and a time to live (TTL).

As noted above, the memory 210 may store a table of one or more extended narrow bandwidth ranges that the UE 110 may select and utilize when conditions support the use of the extended narrow bandwidth. In a first example, the table may include only one available extended narrow bandwidth range such that opting to utilize this feature entails selecting this one available extended narrow bandwidth range. In a second example, the table may include two or more available extended narrow bandwidth ranges. When an option is available from two or more ranges, the monitoring application 240 may utilize the result of determining the measurement quality to select among the multiple available extended bandwidth ranges. For example, if the measurement quality is within an acceptable threshold, the monitoring application 240 may utilize the assigned narrow bandwidth as indicated by the eNB 122A. In another example, if the measurement quality is slightly outside the acceptable threshold, the monitoring application 240 may utilize a smallest available extended narrow bandwidth range (e.g., from the assigned 1.4 MHz to an extended 5.0 MHz). In a further example, if the measurement quality is significantly outside the acceptable threshold, the monitoring application 240 may utilize a largest available extended narrow bandwidth range (e.g., from the assigned 1.4 MHz to an extended 20.0 MHz). In this manner, the monitoring application 240 may utilize a determination threshold to determine whether the extended narrow bandwidth is to be used and one or more selection thresholds to determine which of the extended narrow bandwidth ranges to select (when two or more extended narrow bandwidth ranges are available).

In a specific example, the table may indicate that there are three available extended narrow bandwidth ranges. Specifically, the narrow bandwidth assigned by the eNB 122A may be 1.4 MHz. The extended narrow bandwidths that are available for use may be 5.0 MHz, 10.0 MHz, and 20.0 MHz. Accordingly, using the determination threshold, the UE 110 may determine whether to continue using the 1.4 MHz assigned narrow bandwidth or utilize one of the three extended narrow bandwidths. If the determination threshold to continue using the assigned narrow bandwidth is not satisfied, the UE 110 may determine whether to use the 5.0 MHz extended narrow bandwidth based on a first selection threshold. If the first selection threshold is not satisfied, the UE 110 may determine whether to use the 10.0 MHz extended narrow bandwidth based on a second selection threshold or the 20.0 MHz extended narrow bandwidth if the second selection threshold is not satisfied. Upon selecting the extended narrow bandwidth, the extension may be applied to the assigned narrow bandwidth to determine the extended narrow bandwidth range. Thereafter, the UE may apply subsequent parameters to the components of the transceiver 225. For example, the RF unit 225A may be set to the selected extended bandwidth, the ADC unit 225B may be set to sample a frequency for the selected extended bandwidth, and the CV unit 225C may set a clock and/or voltage level appropriate for the selected extended bandwidth. Furthermore, the baseband processor 205 may be configured to use the value of the selected extended narrow bandwidth.

It should be noted that the exemplary embodiments are described with the table being stored in the memory 210 in which the UE 110 is allowed to use a predetermined extended narrow bandwidth. However, the predetermined nature of the extended narrow bandwidth is only exemplary. Those skilled in the art will understand that the exemplary embodiments may be modified for dynamically selecting and/or determining the extended narrow bandwidth to utilize. For example, based on a difference of the measurement quality to the determination threshold, the monitoring application 240 may determine that the assigned narrow bandwidth is to be extended by a certain value such that the measurement quality at least satisfies the determination threshold.

The monitoring application 240 may be configured to dynamically swap between the assigned narrow bandwidth range and the extended narrow bandwidth range (e.g., from 900-901.4 MHz [using a 1.4 MHz assigned narrow bandwidth] to 900-905 MHz [using a 5.0 MHz extended narrow bandwidth]). The monitoring application 240 may also be configured to dynamically swap between one extended narrow bandwidth range to another extended narrow bandwidth range when two or more extended narrow bandwidth ranges are available (e.g., from 900-910 MHz [using a 10.0 MHz extended narrow bandwidth] to 900-905 MHz [using a 5.0 MHz extended narrow bandwidth]). The monitoring application 240 may further be configured to dynamically alter how an extended narrow bandwidth is to be applied to the assigned narrow bandwidth range such that the monitoring application 240 may dynamically swap between one extended narrow bandwidth range to another extended narrow bandwidth range when a single extended narrow bandwidth is selected (e.g., from 900-905 MHz [using a 5.0 MHz extended narrow bandwidth range] to 901-906 MHz [also using a 5.0 MHz extended narrow bandwidth range]).

Those skilled in the art will understand that the conditions being experienced by the UE 110 may remain relatively unchanged over a period of time or may also be changing (sometimes significantly) over a course of time. For example, when the UE 110 is mobile, the conditions may allow for the assigned narrow bandwidth to be utilized at a first time. However, at a second time, the UE 110 may have moved such that the conditions may indicate that the extended narrow bandwidth is to be used. Thus, the UE 110 may utilize the extended narrow bandwidth feature. However, at a third time, the conditions may again allow for the assigned narrow bandwidth to be utilized. Thus, the UE 110 may return to using the assigned narrow bandwidth range. In this manner, the UE 110 may dynamically swap between using or not using the extended narrow bandwidth feature. Accordingly, the power conservation feature may be maximized in this example by providing that the UE 110 uses the assigned narrow bandwidth when it is satisfactory and only switching to the extended narrow bandwidth when the assigned narrow bandwidth is unsatisfactory. As described above, the determination of satisfactory or unsatisfactory may be based on one or more thresholds related to the various measurements that are based on the received CRS tones. It should be understood that throughout this description, when it is stated that the assigned narrow bandwidth range is unsatisfactory (or other such similar language), this does not mean that the measurements are a failure or the UE 110 is failing to operate properly, but that a defined threshold has not been satisfied (which in some cases may result in some sort of failure in operation by the UE 110, but not in all cases).

In another example, at a first time, the conditions may allow for a first extended narrow bandwidth to be used. However, at a second time, the conditions may indicate that a second extended narrow bandwidth is to be used. Then at a third time, the conditions may indicate that the first extended narrow bandwidth range is again to be used. In this manner, the UE 110 may dynamically swap between two or more different extended narrow bandwidths. Accordingly, the power conservation feature may also be maximized (e.g., an extended narrow bandwidth that is less than another extended narrow bandwidth allows for less monitoring and more power conservation). In a further example, at a first time, the conditions may allow for a first extended narrow bandwidth range to be used (e.g., the 5 MHz extended bandwidth range from 900-905 MHz). However, at a second time, the conditions may indicate that the first extended narrow bandwidth range is still to be used, but at a different frequency range (e.g., the 5 Mhz extended bandwidth range from 901-906 MHz). In this manner, the UE 110 may dynamically change how a selected extended narrow bandwidth is to be applied to the assigned narrow bandwidth range.

Figure 3:
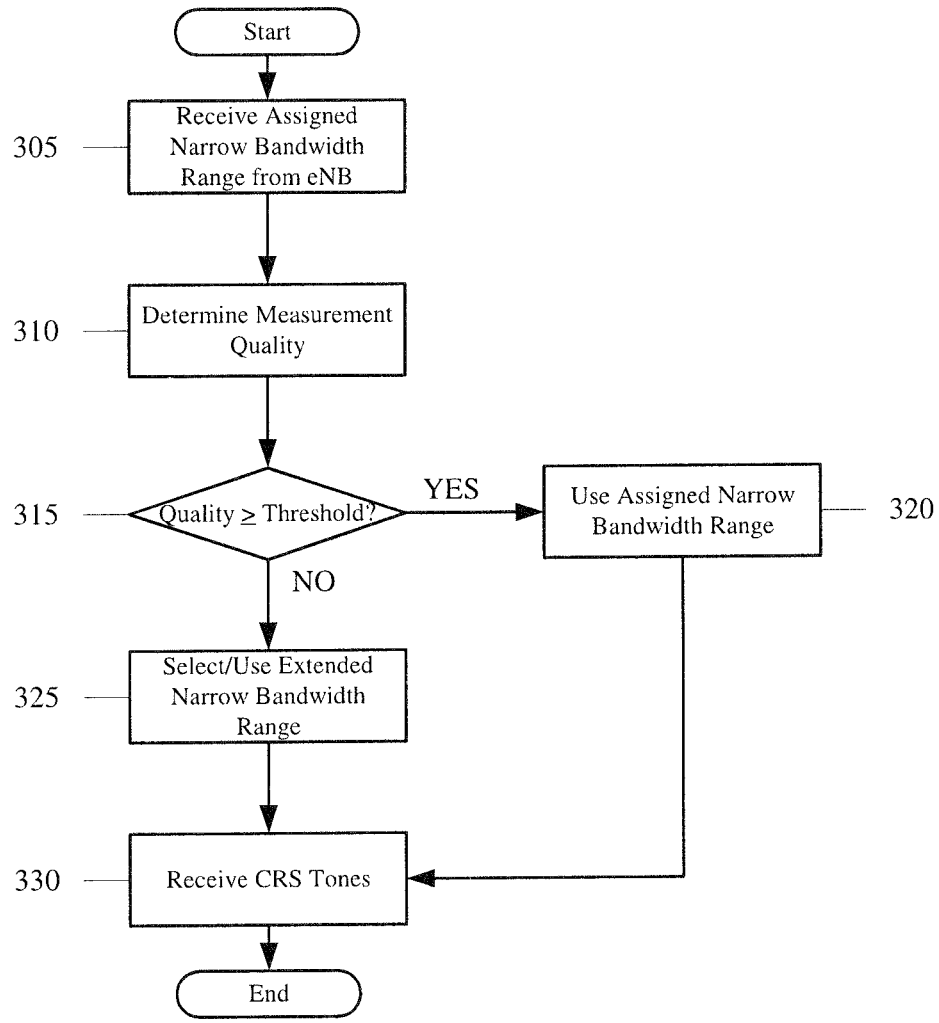
FIG. 3 shows a method for dynamically utilizing an extended narrow bandwidth range according to the various exemplary embodiments described herein.

FIG. 3 shows a method 300 for dynamically utilizing an extended narrow bandwidth range according to the exemplary embodiments. The method 300 relates to how the UE 110 determines whether the extended narrow bandwidth feature is to be utilized. Subsequently, if the extended narrow bandwidth feature is to be utilized, an extended narrow bandwidth is applied to the assigned narrow bandwidth range (to create an extended narrow bandwidth range)

for a monitoring functionality to receive CRS tones. The method 300 will be described with regard to the network arrangement 100 of FIG. 1 and the UE 110 of FIG. 2.

In 305, the UE 110 receives an assigned narrow bandwidth range from the eNB 122A. For example, the eNB 122A may determine that the narrow bandwidth feature is to be utilized for the UE 110. The eNB 122A may determine the range for the narrow bandwidth feature and select a narrow bandwidth range within an overall bandwidth of the LTE-RAN 122. The eNB 122A may transmit control information (e.g., via a PDCCH) to the UE 110 indicating the assigned narrow bandwidth range that is to be used.

In 310, the UE 110 determines a measurement quality. As described above, the measurement quality may be based on a variety of different factors. For example, in some cases, the average value of a selected measurement may be used. In other case, the average value for a selected measurement may not be indicative of a true average such that a poor measurement quality results and other types of sampling may be used (e.g., local minimums, weighted time sampling, median values, etc.). In another example, the RSRP for the narrow bandwidth may be determined. In a further example, Doppler spread may be measured. It should be noted from these examples that there may be many types of measurements on the CRS tones that may be used to determine whether the extended narrow bandwidth should be used.

In 315, the UE 110 determines whether the measurement quality is greater than the determination threshold. As described above, the determination threshold may be a first type of threshold that is used to determine whether the narrow bandwidth feature is to be used. Thus, if the measurement quality satisfies the determination threshold, the UE 110 continues the method 300 to 320. However, if the measurement quality does not satisfy the determination threshold, the UE 110 continues the method 300 to 325.

In 320, when the measurement quality satisfies the determination threshold, the UE 110 uses the assigned narrow bandwidth range as indicated by the eNB 110. Thereafter, in 330, the UE 110 may monitor the narrow bandwidth range to receive CRS tones used to determine the network measurements.

In 325, when the measurement quality does not satisfy the determination threshold, the UE 110 determines that the assigned narrow bandwidth does not satisfy the threshold such that the UE 110 may then select an extended narrow bandwidth. As described above, the UE 110 may be configured to use one or more different extended narrow bandwidths (e.g., when the narrow bandwidth is 1.4 MHz, the extended narrow bandwidths may be 5.0 MHz, 10.0 MHz, 20.0 MHz, etc.). When only one extended narrow bandwidth is available, the UE 110 determines the manner in which the assigned narrow bandwidth range is to be extended based on the extended narrow bandwidth. When more than one extended narrow bandwidth is available, the UE 110 may utilize one or more selection thresholds to determine which of the extended narrow bandwidths to use and then extend the assigned narrow bandwidth range accordingly. Thereafter, in 330, the UE 110 may monitor the selected extended narrow bandwidth range to receive CRS tones used to determine the network measurements.

It is noted that the method 300 may be modified or changed based on the above described features. In a first example, the above noted selection thresholds may be incorporated into the method 300. For example, after 315 when the measurement quality does not satisfy the determination threshold, the UE 110 may determine a number of available extended narrow bandwidths. If there is only one extended narrow bandwidth, the UE 110 may select this bandwidth and apply it to the assigned narrow bandwidth. However, if there is more than one extended narrow bandwidth, the UE 110 may utilize the selection thresholds through a repeated process when larger extended narrow bandwidths are to be used. In a second example, the method 300 may include further operations to determine whether the measurement quality has improved or worsened. If the measurement quality has changed, the UE 110 may return the method 300 to 310 to determine how the extended narrow bandwidth is to be changed or whether the assigned narrow bandwidth is to be used. In a third example, the method 300 may include further operations to determine whether a selected extended narrow bandwidth range results in an improved measurement quality. If there is an improvement, the UE 110 may continue to utilize the extended narrow bandwidth range. However, if there is no improvement or insufficient improvement, the UE 110 may change how the extended narrow bandwidth is applied to the assigned narrow bandwidth (e.g., shift to a lesser minimum or a greater maximum).

The exemplary embodiments may be utilized for a plurality of different implementations or use cases. The following describes various manners in which the exemplary embodiments may be utilized to provide examples of different types of improvements or features that may overcome issues involved with using a narrow bandwidth assigned by the eNB 122A.

In a first exemplary implementation, the extended narrow bandwidth feature according to the exemplary embodiments may be utilized for large-scale parameters and channel estimation. Specifically, the first exemplary implementation relates to a tradeoff of power usage and estimating these large-scale parameters and channel estimation performance. As noted above, increasing a bandwidth range increases a number of CRS tones but also increases power consumption, whereas decreasing the bandwidth range reduces a number of CRS tones but also decreases power consumption. Accordingly, finding a balance between these factors allows for maximizing power conservation while determining reliable measurements and/or calculations. For example, wide band CRS in legacy devices is monitored and may be used to estimate delay spread, Doppler spread, etc. Such measurements may be considered large-scale parameters for channel estimation. However, with a narrow bandwidth, the channel estimation may not be available or reliable resulting in channel estimation performance being significantly degraded. Specifically, with wide band CRS and an increased number of received CRS tones, a linear minimum mean square error (LMMSE) operation may be used for the channel estimation which outperforms a least square (LS) operation for the channel estimation which is used when fewer CRS tones are received.

In one manner of using the CRS tones, the CRS tones may be used to estimate network parameters for both control channels and data channels. Thus, in consideration of minimizing power consumption, a minimum number of CRS tones should be received in estimating these network parameters in a reliable manner. Although several examples of triggering the use of the extended narrow bandwidth are provided above, there may be further examples of when the extended narrow bandwidth may be identified for use.

In a first example, a power factor may be considered. The power factor may relate to a RF and/or baseband power for receiving a number of extra resource blocks per subframe corresponding to the increased number of CRS tones to be received. As those skilled in the art will recognize, if the power penalty of measuring over extra resource blocks is small, there is greater reward for measuring a larger bandwidth range. Thus, a determination may be made to utilize the extended narrow bandwidth feature. However, if the power penalty of measuring over extra resource blocks is large, there is less reward for measuring a larger bandwidth range. Thus, a determination may be made to maintain using the assigned narrow bandwidth or a lower extended narrow bandwidth.

In a second example, a channel factor may be considered. The channel factor may relate to an assessment of the current channel quality based on various network parameters such as signal to noise ratio (SNR), RSRP, RSRQ, etc. As those skilled in the art will recognize, if the SNR, RSRP, RSRQ, etc. is low, the decoding performance in channel estimation is degraded. Thus, a determination may be made to utilize the extended narrow bandwidth feature. However, if the network parameter is high, the decoding performance in channel estimation is improved. Thus, a determination may be made to utilize the assigned narrow bandwidth feature or a lower extended narrow bandwidth.

In a third example, a channel variation in frequency factor may be considered. The channel variation in frequency factor may relate to an assessment of channel variation in frequency based on, for example, delay spread. As those skilled in the art will recognize, if the frequency diversity is large, there is a greater reward for measuring the parameter over a larger bandwidth range, otherwise the accuracy may not be sufficient. Thus, a determination may be made to utilize the extended narrow bandwidth feature. However, if the frequency diversity is small, there is a lower reward for measuring the parameter over the larger bandwidth range. Thus, a determination may be made to utilize the assigned narrow bandwidth feature or a lower extended narrow bandwidth.

In a fourth example, a channel variation in time factor may be considered. The channel variation in time factor may relate to an assessment of channel variation in time based on, for example, Doppler spread or Doppler shift. As those skilled in the art will recognize, if the parameter measurement results take a large amount of time, there is a greater reward for measuring the parameter over a larger bandwidth range. Thus, a determination may be made to utilize the extended narrow bandwidth feature. However, if the parameter measurement results take a small amount of time, there is a lower reward for measuring the parameter over the larger bandwidth range. Thus, a determination may be made to utilize the assigned narrow bandwidth feature or a lower extended narrow bandwidth.

Figure 4:
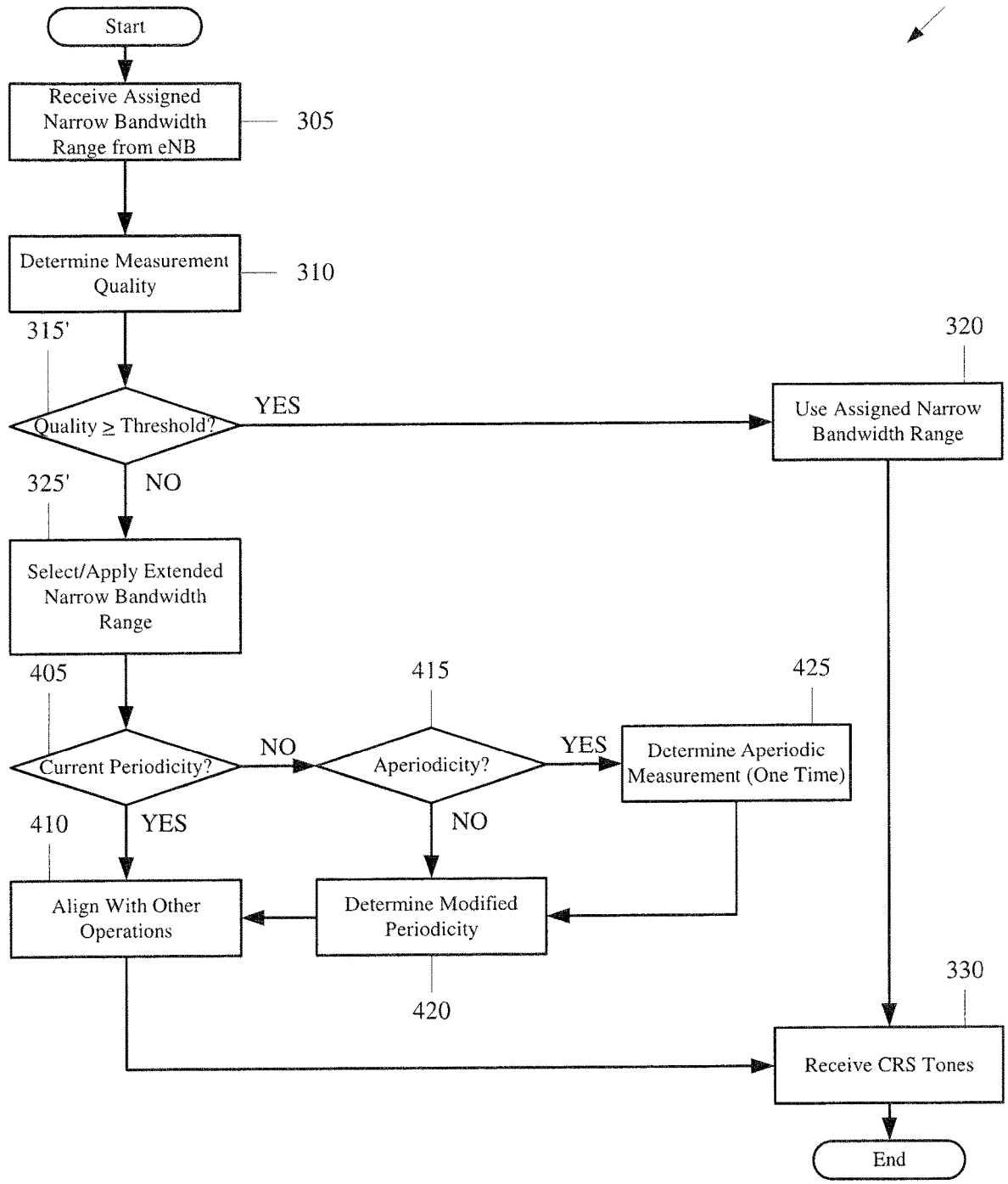
FIG. 4 shows a method for dynamically utilizing an extended narrow bandwidth range in consideration of periodicity according to the various exemplary embodiments described herein.

In a specific use case of the first exemplary implementation where the CRS tones are used to estimate network parameters for both control channels and data channels, the method 300 may be modified to consider a periodicity in using the extended narrow bandwidth feature. Specifically, 315-330 may be modified to incorporate the periodicity consideration. FIG. 4 shows a method 400 for dynamically utilizing an extended narrow bandwidth range in consideration of periodicity according to the exemplary embodiments. Specifically, the method 400 may be a modified method 300.

The method 400 may begin with 305 and 310 as described above. Following 310, the method 400 may include a modified 315. In 315', the UE 110 may determine whether the extended narrow bandwidth feature is to be used. The UE 110 may again utilize various network parameters such as SNR, RSRQ, RSRP, delay spread, Doppler spread, a history of decoding/channel estimation performance, etc. The measurements may be compared to a corresponding determination threshold to determine whether the extended narrow bandwidth feature would provide benefits over the power consumption of monitoring the extended bandwidth range. Furthermore, the UE 110 may evaluate the selection for the extended narrow bandwidth feature at various times. In a first example, an evaluation to use the extended narrow bandwidth may be performed periodically based on the settings or configuration of the UE 110 (e.g., automatically or manually set, at a predetermined periodicity, a dynamic periodicity, etc.). In a second example, an evaluation to use the extended narrow bandwidth may be triggered by an event such as a VoLTE status, a downlink data traffic scheduling, etc. In a third example, a combination of the above periodicities may be used.

If a determination is made that the measurements satisfy the determination threshold as measured during the selected periodicity, the UE 110 may perform 320 in which the assigned narrow bandwidth range provided by the eNB 122A is used to receive CRS tones (e.g., 330).

If a determination is made that the measurements do not satisfy the determination threshold as measured during the selected periodicity, the UE 110 may use a modified 325. In 325', the extended narrow bandwidth is selected and applied to the assigned narrow bandwidth range to create an extended narrow bandwidth range. Thereafter, in 405, the UE 110 determines whether the measurement periodicity of the extended narrow bandwidth range has a sufficient periodicity. That is, the UE 110 may further select between a current periodicity, a modified periodicity, or an aperiodicity to be used with the extended narrow bandwidth range.

In determining whether the periodicity is sufficient, the UE 110 may consider a variety of factors. In a first example, the UE 110 may utilize block error rate (BLER) statistics. For example, if a measured BLER is less than a threshold, the current periodicity for measurements using the extended narrow bandwidth range may be sufficient. Otherwise, if the BLER is above the threshold, the UE 110 may determine that the current periodicity is insufficient. In a second example, the UE 110 may utilize a SNR, a RSRQ, a Doppler spread, etc. For example, if the SNR and/or the RSRQ is less than a threshold or the Doppler spread changes beyond a threshold, the current periodicity may be insufficient. Otherwise, the UE 110 may determine that the current periodicity is sufficient. In a third example, the UE 110 may utilize a combination of the above examples as well as consider other inputs.

If the UE 110 determines that the current periodicity is sufficient, the UE 110 may continue the method 400 to 410. For example, a wide CRS reception over an entire band may be triggered with a periodicity of a predetermined time period during which subframes of the wideband reception large-scale channel parameters are calculated. In another example, for MPDCCH and/or PDSCH, a nearest parameter measurement result may be applied for channel estimation and demodulation. In 410, the UE 110 aligns the measurements for the extended narrow bandwidth range with other operations. For example, the measurements may be aligned with operations associated with a connected discontinuous reception (CDRX) cycle. For example, the measurements may be aligned with an onDuration, a measurement gap, a MPDCCH subframe, a PDSCH subframe, a physical uplink shared channel (PUSCH) subframe, etc. By aligning the measurements to these other operations, the UE 110 may further maximize power conservation while generating reliable measurements. The UE 110 may align the measurement by, for example, restricting a starting subframe for the measurement to align with CDRX and measurement configurations.

If the UE determines that the current periodicity is insufficient, the UE 110 may continue the method 400 to 415. In 415, the UE 110 may determine whether an aperiodicity is needed. Specifically, the aperiodicity may refer to a one-time measurement being used. If an aperiodicity is not used, the UE 110 may continue the method 400 to 420. In 420, with the current periodicity being insufficient but with no aperiodicity being used, the UE 110 may determine a modified periodicity. Specifically, the modified periodicity may be one that satisfies the above noted factors to determine whether the current periodicity is sufficient. In one exemplary embodiment, the UE 110 may consider factors such as (1) a number of resource blocks or narrow bandwidths above a selected narrow bandwidth of on-going MPDCCH and/or PDSCH reception, (2) a number of resource blocks or narrow bandwidths below a selected narrow bandwidth of on-going MPDCCH and/or a PDSCH reception, and/or (3) a periodicity of the extra narrow bandwidth reception. Otherwise, when the UE 110 determines that an aperiodicity (e.g., a one-time measurement) should be used, the method 400 may continue to 425. In 425, the UE 110 may determine a subframe in which to perform this one-time measurement by considering, for example, a set of subframe indices over which the extra narrow bandwidths are to be monitored and measured. In a particular embodiment, the UE 110 may receive two extra narrow bandwidths on two subframes that a MPDCCH is scheduled. The UE 110 may also use the measured large-scale parameters for both MPDCCH and PDSCH channel estimation and demodulation.

If the UE 110 performs 420, the UE 110 may then perform 410 to align the measurements of the modified periodicity with the other operations (e.g., CDRX operations). If the UE 110 performs 425, the UE 110 may then perform 420 to determine a modified periodicity and then use 410 to align the measurements of the aperiodicity and the modified periodicity with the other operations.

In a second exemplary implementation, the extended narrow bandwidth feature according to the exemplary embodiments may overcome band edge issues that may arise. As those skilled in the art will understand, to properly decode received signals with minimal errors, interference such as distortion, noise, attenuation, phase shift, etc. applied by the signal traveling through a channel is removed. Thus, channel estimation may be used to determine the discrepancy caused by the signal traveling through the channel to prepare for decoding the received signals. Although the UE 110 may have been receiving CRS tones to reliably estimate a channel, the UE 110 may have moved and experienced a Doppler shift or other condition where CRS tones are not received at an expected parameter (e.g., frequency, strength, direction, etc.) due to the signal traveling through the channel. For example, the CRS tones that are being received may have moved along the assigned narrow bandwidth range or the extended narrow bandwidth range. Specifically, with regard to a particular resource block where a CRS tone is received, the CRS tone that has moved may be at an edge of the bandwidth range. As those skilled in the art will understand, the channel estimation operation benefits from information surrounding the CRS tone. Specifically, information from further CRS tones both above and below the frequency of the CRS tone may provide a more complete analysis for the channel estimation. However, when the CRS tone is at an edge, only CRS tones below (or above depending on which edge) the CRS tone are available.

Figure 5C:
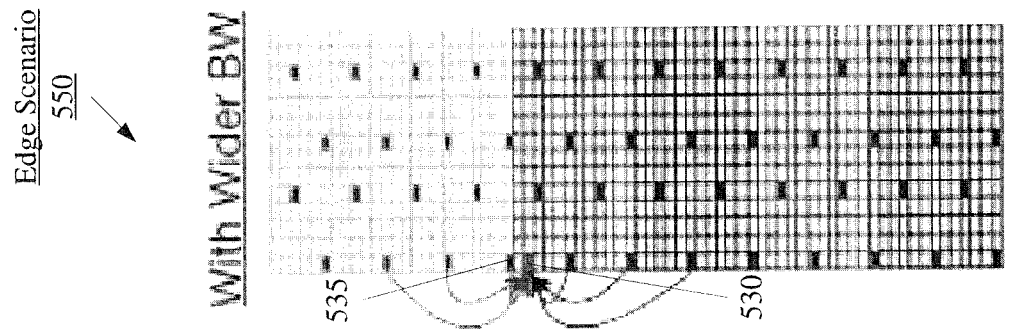
FIGS. 5A-C show a plurality of scenarios for receiving tones used in channel estimation according to the various exemplary embodiments described herein.
Figure 5B:
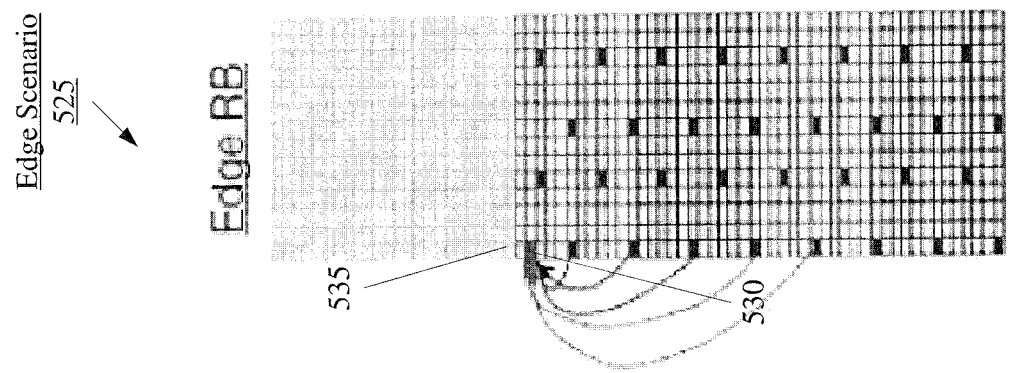
Figure 5A:
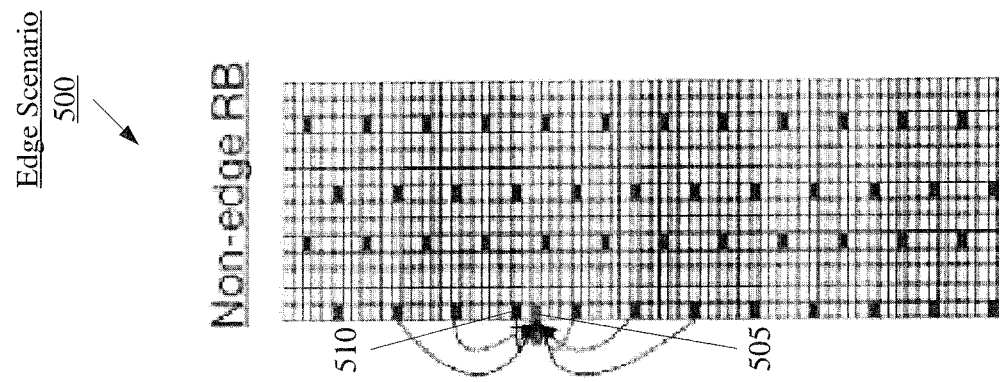

FIGS. 5A-C show a plurality of scenarios for receiving tones that may be used in channel estimation according to the exemplary embodiments. Specifically, FIG. 5A shows a scenario 500 in which a resource block 505 has a received signal with a CRS tone that may be used for channel estimation. Specifically, the CRS tone in the resource block 505 may correspond to an expected CRS tone in resource block 510 (e.g., which is expected at a higher frequency). Again, the CRS tone in the resource block 505 may have resulted from the received signal traveling through the channel. However, since the resource block 505 (corresponding to CRS tone to be received in the resource block 510) has neighboring CRS tones both above and below on the bandwidth range, the channel estimation may be performed with a more complete analysis as shown by the arrows for the neighboring CRS tones above and below the resource block 505.

FIG. 5B shows a scenario 525 in which the resource block 530 has a received signal with a CRS tone that may be used for channel estimation. In a substantially similar manner, the CRS tone received in the resource block 530 may have resulted from the received signal traveling through the channel. Specifically, the CRS tone received in the resource block 530 may have been expected at a frequency corresponding to a resource block 535 (e.g., at a higher frequency). However, as illustrated, the resource block 530 is at an edge of the narrow bandwidth range such that the resource block 530 only has neighboring CRS tones below on the bandwidth range with no neighboring CRS above on the bandwidth range because in scenario 525, the UE is only monitoring the narrow bandwidth and not the full bandwidth (as is the case in scenario 500). The scenario 500 in the above described first situation may have a reliable channel estimation being determined as CRS tones in both directions relative to the resource block 505 are available. However, the scenario 525 may illustrate when a shift or other circumstance results in the resource block 530 being on an edge of the bandwidth range. In the scenario 525, the channel estimation performed at the resource block 530 may be insufficient or not reliable. For example, only the CRS tones below the resource block 530 are used for the channel estimation and the shift may cause the unreliable measurements.

In view of the scenario 525, the exemplary embodiments provide a mechanism to overcome the band edge issue. As described above, there may be a variety of different ways for the UE 110 to determine whether to utilize the extended narrow bandwidth feature. The band edge issue may be yet another way for the UE 110 to select using the extended narrow bandwidth feature. Specifically, for a given resource block (e.g., resource block 530), the UE 110 may determine if there are sufficient CRS tones being received for the channel estimation to be properly determined. If insufficient, the UE 110 may utilize the extended narrow bandwidth feature.

When the extended narrow bandwidth feature is used, the resource block 530 having insufficient CRS tones in a particular direction due to the band edge issue may have the bandwidth in that direction extended. FIG. 5C shows a scenario 550 in which the resource block 530 used for channel estimation that had a band edge issue now has further neighboring CRS tones being received beyond the original band edge. In this manner, the channel estimation may be performed in a more reliable manner where the power consumption that is used provides further benefit for subsequent operations to be performed or for an overall performance of the UE 110 to be improved.

It is noted that the use of the extended narrow bandwidth feature may be utilized during the time that the band edge issue is being resolved. For example, after using the extended narrow bandwidth for the channel estimation, the UE 110 may return to using the assigned narrow bandwidth although the band edge issue may still persist. In this manner, the UE 110 may dynamically select when to utilize the extended narrow bandwidth feature to maximize power conservation.

It is also noted that the scenarios 525, 550 are only exemplary. Specifically, the resource block 530 being at the band edge such that no CRS tones above the resource block are being received is only exemplary. In other scenarios where the resource block 530 is near (but not at) the band edge may also trigger the use of the extended narrow bandwidth feature. For example, the UE 110 may determine that at least two CRS tones should be used in both directions of the resource block for a reliable channel estimation to be determined. However, the resource block 530 may be at a location where only one CRS tone is available above while two or more CRS tones are available below. In this scenario, the UE 110 may again opt to utilize the extended narrow bandwidth feature.

In a third exemplary implementation, the extended narrow bandwidth feature according to the exemplary embodiments may generate improved channel estimation measurements such that subsequent operations may also be improved, particularly to further maximize power conservation. Those skilled in the art will understand the benefits of having a reliable channel estimation such as improved transceiver performance in receiving data from the eNB 122A. Specifically, the transceiver 225 may be configured with more reliable settings to receive data from the eNB 122A such that a cyclic redundancy check (CRC) or other verification operation passes with a higher probability at an earlier time. Therefore, the transceiver 225 may be placed into a deactivated or sleep state to conserve power. When data is received from the eNB 122A, but does not result in the CRC passing, the transceiver 225 may be activated again or remain activated until the data has been successfully received. Accordingly, more power is used for this process to complete.

As those skilled in the art will understand, the power used by the transceiver 225 in this manner may even be greater than any power used by implementing the extended narrow bandwidth feature according to the exemplary embodiments. Therefore, by using the extended narrow bandwidth feature in determining a more reliable channel estimation (utilizing a higher instant power), the transceiver 225 may be properly configured for data to be received successfully (e.g., CRC pass) to reduce further usage of the transceiver 225 in receiving this data (which would otherwise utilize a higher sustained power). It is noted that the use of the extended narrow bandwidth feature may apply to receiving data via the PDSCH, although the feature is not limited to the PDSCH. As those skilled in the art will understand, control information transmitted via the PDCCH may generally be more reliable such that the assigned narrow bandwidth may be sufficient for proper reception via the PDCCH. However, the extended narrow band feature may also be used with the PDCCH.

In performing more reliable channel estimation measurements, the UE 110 may utilize different procedures to select a monitoring bandwidth to execute channel estimation. In a first example, the UE 110 may first determine when a TTI for a PDSCH reception is reached. As noted above, a PDCCH reception may already be more reliable and the assigned narrow bandwidth provided by the eNB 122A may be used. With the PDSCH, the UE 110 may determine whether an extended narrow bandwidth has already been applied to create an extended narrow bandwidth range. If already performed, the UE 110 may continue to utilize this extended narrow bandwidth range for channel estimation. However, if not currently using the extended narrow bandwidth, the UE 110 may determine whether a currently measured SINR is greater than a SINR threshold. If the SINR is greater, then the UE 110 may continue to utilize the assigned narrow bandwidth. However, if the SINR is less, the UE 110 may select and apply an extended narrow bandwidth to create an extended narrow bandwidth range that is used for the channel estimation.

In a second example, the UE 110 may first determine whether a TTI for a PDSCH is assigned at a band edge. As noted above, a PDSCH at a band edge may result in a channel estimation determination to be less reliable or even unusable. Thus, the UE 110 may determine whether the PDSCH at a given TTI is at a band edge. It is noted that the band edge may be relative to the assigned narrow bandwidth range provided by the eNB 122A. The UE 110 may determine whether an extended narrow bandwidth has already been applied to create an extended narrow bandwidth range. If already performed, the UE 110 may continue to utilize this extended narrow bandwidth range for channel estimation if this extended narrow bandwidth range resolves the band edge issue. However, if not currently using the extended narrow bandwidth, the UE 110 may determine whether a currently measured SINR is greater than a SINR threshold. If the SINR is greater, then the UE 110 may continue to utilize the assigned narrow bandwidth. However, if the SINR is less, the UE 110 may select and apply an extended narrow bandwidth to create an extended narrow bandwidth range that is used for the channel estimation.

It is noted that the use of the SINR described in the two examples above is only exemplary. As described in detail above, the UE 110 may utilize any number of different network parameters and considerations and combinations thereof in determining whether to utilize the extended narrow bandwidth feature. Thus, the above examples may also be modified to be used with these other types of network parameters/considerations.

In a third example, the UE 110 may first determine whether a TTI for a measurement has been reached. It is noted that the following may be used to improve the channel estimation but may also apply to improving measurement of other network parameters including, for example, RSRP, RSSI, RSRQ, etc. When the UE 110 is at a TTI corresponding to performing a measurement of a network parameter, the UE 110 may determine whether an extended narrow bandwidth has already been applied to create an extended narrow bandwidth range. If already performed, the UE 110 may continue to utilize this extended narrow bandwidth range to measure the network parameters. However, if not currently using the extended narrow bandwidth, the UE 110 may determine whether a currently measured network parameter (e.g., RSRP) is greater than a measurement threshold (e.g., RSRP threshold). If the measurement is greater, then the UE 110 may continue to utilize the assigned narrow bandwidth. However, if the measurement is less, the UE 110 may select and apply an extended narrow bandwidth to create an extended narrow bandwidth range that is used to improve the measurement of the network parameter.

When improving the measurement of network parameters, the UE 110 may utilize the extended narrow bandwidth feature for a variety of reasons. In a first example, a scheduled resource block may be in a deep fade and require wideband measurement (e.g., extended narrow bandwidth) to decide certain operations (e.g., handover, cell-reselection, etc.). Otherwise, the UE 110 may experience a ping gong effect in which the UE 110 is handed over repeatedly. In such a scenario, the UE 110 may utilize a high instant power in which the extended narrow bandwidth feature is used to improve the network parameter to prevent further, more significant power consumption from other operations being performed. In a second example, a narrow bandwidth measurement may not reliably reflect large-scale parameters, particularly with regard to delays and/or Doppler spreads.

The exemplary embodiments provide a device, system, and method of extending a narrow bandwidth range assigned by a base station of a network. The assigned narrow bandwidth range may decrease a bandwidth range that is to be monitored by the device in receiving CRS tones to conserve power. However, with a variety of different scenarios and reasons where a decreased number of received CRS tones has increased drawbacks, the device may be configured to extend the assigned narrow bandwidth range to an extended narrow bandwidth range. The device may determine various measurements of network parameters or utilize other considerations in determining whether to utilize the extended narrow bandwidth feature. The device may also utilize a plurality of different extended narrow bandwidths that is to be applied to the narrow bandwidth range to create the extended narrow bandwidth range.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a device:
   receiving signals in a narrow bandwidth range from a base station of a network, the narrow bandwidth range being a portion of an overall bandwidth range of the network and the signals comprising one or more of cell-specific reference signal (CRS) tones;
   determining whether a condition exists based on the one or more CRS tones;
   when the condition exists, extending the narrow bandwidth range to an extended narrow bandwidth range, the extended narrow bandwidth range including at least one further CRS tone than the narrow bandwidth range; and
   monitoring the extended narrow bandwidth range to receive further signals comprising the at least one further CRS tone.

2. The method of claim 1, wherein the condition is a measurement of a network parameter value based on the one or more CRS tones not satisfying a corresponding network parameter threshold.

3. The method of claim 2, wherein the network parameter is a reference signal received power (RSRP), a reference signal received quality (RSRQ), a received signal strength indicator (RSSI), a channel state information (CSI), a channel quality indicator (CQI), a rank indicator (RI), a precoding matrix indicator (PMI), a signal to noise ratio (SNR), or a signal to interference plus noise ratio (SINR).

4. The method of claim 2, wherein the extended narrow bandwidth range is selected from one of a plurality of available extended narrow bandwidth ranges.

5. The method of claim 4, wherein the extended narrow bandwidth range is selected from the plurality of available extended narrow bandwidth ranges based on the network parameter value and corresponding thresholds.

6. The method of claim 1, wherein the extended narrow bandwidth range extends the narrow bandwidth range one of (i) equally from a lowest bandwidth value and a highest bandwidth value of the narrow bandwidth range, (ii) unequally from the lowest bandwidth value and the highest bandwidth value of the narrow bandwidth range, (iii) only from the lowest bandwidth value of the narrow bandwidth range or (iv) only from the highest bandwidth value of the narrow bandwidth range.

7. The method of claim 1, further comprising:
   determining whether the condition exists based on the at least one further CRS tone; and
   when the condition exists, extending the extended narrow bandwidth range to a further extended narrow bandwidth range, the further extended narrow bandwidth range including at least one additional CRS tone than the extended narrow bandwidth range.

8. The method of claim 1, wherein the condition comprises one of (i) a power factor for receiving extra resource blocks for the at least one further CRS tone, (ii) a channel variation in frequency for the CRS tones, (iii) a channel variation in time for the CRS tones, (iv) a scheduling of downlink data traffic, (v) an initiation of a Voice over LTE (VoLTE) functionality, or (vi) the one or more CRS tones are included in an edge resource block.

9. The method of claim 1, further comprising:
   determining a periodicity of the determining whether a condition exists;
   determining whether the periodicity is sufficient for the extended narrow bandwidth range monitoring; and
   when the periodicity is not sufficient, determining a new periodicity for the extended narrow bandwidth range.

10. The method of claim 9, wherein the determining whether the periodicity is sufficient is based on one of a block error rate (BLER), a reference signal received quality (RSRQ), a signal to noise ratio (SNR) or a Doppler spread.

11. The method of claim 9, further comprising:
    when the periodicity is not sufficient, determining whether a one-time aperiodicity determination is to be performed.

12. A device, comprising:
    a transceiver configured to establish a connection to a base station of a network, the transceiver receiving a narrow bandwidth range from the base station, the narrow bandwidth range being a portion of an overall bandwidth range of the network, the transceiver configured to receive signals in the narrow bandwidth range, the signals comprising one or more cell-specific reference signal (CRS) tones; and a processor configured to determine whether a condition exists based on the one or more CRS tones and when the condition exists, extend the narrow bandwidth range to an extended narrow bandwidth range, the extended narrow bandwidth range including at least one further CRS tone than the narrow bandwidth range, wherein the transceiver monitors the extended narrow bandwidth range to receive further signals comprising the at least one further CRS tone.

13. The device of claim 12, wherein the base station is an evolved Node B (eNB) and the network is a Long Term Evolution (LTE) network.

14. The device of claim 12, wherein the transceiver comprises:
   an RF unit that is set to the extended narrow bandwidth range;
   an analog to digital converter that is set to sample a frequency for the extended narrow bandwidth range; and
   a control voltage unit that sets one of a clock or a voltage level based on the extended narrow bandwidth range.

15. The device of claim 12, wherein the condition is a measurement of a network parameter value based on the one or more CRS tones not satisfying a corresponding network parameter threshold.

16. The device of claim 15, wherein the extended narrow bandwidth range is selected from one of a plurality of available extended narrow bandwidth ranges based on the network parameter value and corresponding thresholds.

17. The device of claim 12, wherein the processor determines whether the condition exists when the extended narrow bandwidth range is monitored and when the condition exists, the processor extends the extended narrow bandwidth range to a further extended narrow bandwidth range, the further extended narrow bandwidth range including at least one additional CRS tone than the extended narrow bandwidth range.

18. The device of claim 12, wherein the processor determines the condition no longer exists and the transceiver reverts back to monitoring the narrow bandwidth range.

19. An integrated circuit, comprising:
   circuitry configured to receive signals in a narrow bandwidth range from a base station of a network, the narrow bandwidth range being a portion of an overall bandwidth range of the network and the signals comprising one or more of cell-specific reference signal (CRS) tones;
   circuitry configured to determine whether a condition exists based on the one or more CRS tones; and
   when the condition exists, circuitry configured to extend the narrow bandwidth range to an extended narrow bandwidth range, the extended narrow bandwidth range including at least one further CRS tone than the narrow bandwidth range.

20. The integrated circuit of claim 19, wherein the condition is a measurement of a network parameter value based on the one or more CRS tones not satisfying a corresponding network parameter threshold.

* * * * *